US008045545B2

(12) United States Patent
Chen (10) Patent No.: US 8,045,545 B2
(45) Date of Patent: Oct. 25, 2011

(54) INTELLIGENT DATABASE EXCHANGE FOR OSPF

(75) Inventor: Huaimo Chen, Bolton, MA (US)

(73) Assignee: FutureWei Technologies, Inc., Plano, TX (US)

( * ) Notice: Subject to any disclaimer, the term of this patent is extended or adjusted under 35 U.S.C. 154(b) by 326 days.

(21) Appl. No.: 12/265,299

(22) Filed: Nov. 5, 2008

(65) Prior Publication Data

US 2009/0161531 A1    Jun. 25, 2009

Related U.S. Application Data

(60) Provisional application No. 61/016,409, filed on Dec. 21, 2007.

(51) Int. Cl.
*H04L 12/50* (2006.01)
*H04Q 11/00* (2006.01)
(52) U.S. Cl. .................................. 370/360; 370/471
(58) Field of Classification Search ................... 370/216, 370/351, 352, 389, 360
See application file for complete search history.

(56) References Cited

U.S. PATENT DOCUMENTS

| 6,757,258 | B1 | 6/2004 | Pillay-Esnault | |
|---|---|---|---|---|
| 7,333,827 | B2* | 2/2008 | Biddiscombe et al. | 455/519 |
| 2007/0019647 | A1 | 1/2007 | Roy et al. | |
| 2007/0253434 | A1* | 11/2007 | Oswal et al. | 370/401 |
| 2008/0008104 | A1* | 1/2008 | Previdi et al. | 370/255 |

FOREIGN PATENT DOCUMENTS

| CN | 1744567 A | 3/2006 |
|---|---|---|
| CN | 1870503 A | 11/2006 |
| CN | 101087250 A | 12/2007 |

OTHER PUBLICATIONS

Moy, J., 1998, The Internet Society, RFC 2328, OSPF Version 2.*
Coltun, R. et al., "OSPF for IPv6," The Internet Society, RFC 2740, 75 pages, Dec. 1999.
Moy, J., "OSPF Version 2," The Internet Society, RFC 2328, 204 pages, Apr. 1998.
Ogier, R., "OSPF Database Exchange Summary List Optimization," The IETF Trust, RFC 5243, 5 pages, May 2008.
International Application No. PCT/CN2008/073597, International Search Report and Written Opinion, 9 pages, Mar. 26, 2009.

(Continued)

*Primary Examiner* — Jason E Mattis
*Assistant Examiner* — Adnan Baig
(74) *Attorney, Agent, or Firm* — Slater & Matsil, L.L.P.

(57) ABSTRACT

The present invention relates to systems and methods for eliminating unnecessary link state database exchanges and processes when two OSPF routers are forming a full adjacency. In particular, the invention provides methods and mechanisms for deducing information about unreachable routers from link state changes received, recording the information about the unreachable routers for a given period of time, constructing a neighbor database summary list that does not contain the LSAs that the neighbor has through using the information about the unreachable routers and reachable routers, and determining whether the neighbor router is restarted after it becomes unreachable. In addition, the present invention provides a few of options to deduce and use the information about the unreachable routers and the information in the link state database for eliminating unnecessary link state database exchanges and processes.

33 Claims, 6 Drawing Sheets

OTHER PUBLICATIONS

Moy, J., "OSPF Version 2," RFC 2328, Network Working Group, Standards Track, Apr. 1998, 244 pages.

Coltun, R., "The OSPF Opaque LSA Option," RFC 2370, Network Working Group, Standards Track, Jul. 1998, 14 pages.

Murphy, P., "The OSPF Not-So-Stubby Area (NSSA) Option," RFC 3101, Network Working Group, Standards Track, Jan. 2003, 34 pages.

Katz, D., et al. "Traffic Engineering (TE) Extensions to OSPF Version 2," RFC 3630, Network Working Group, Standards Track, Sep. 2003, 13 pages.

Ogier, R., "OSPF Database Exchange Summary List Optimization," OSPF Working Group, Internet-Draft, Jan. 2, 2007, 6 pages.

Ishiguro, K., et al., "Traffic Engineering Extensions to OSPF version 3," Network Working Group, Standards Track, Jan. 3, 2007, 17 pages.

\* cited by examiner

LLS Data Block in OSPF Packet

FIG. 5

Format of Router Up Time Period (TLV)

|0|1|2|3|
|0 1 2 3 4 5 6 7 8 9 0 1 2 3 4 5 6 7 8 9 0 1 2 3 4 5 6 7 8 9 0 1|

| 1 | 4 | RT | LR |

Extended Options TLV

FIG. 6

INTELLIGENT DATABASE EXCHANGE FOR OSPF

CROSS-REFERENCES TO RELATED APPLICATIONS

This application claims benefit of the filing date of U.S. Provisional Application 61/016,409, filed Dec. 21, 2007, commonly assigned, and which is incorporated herein by reference for all purposes.

BACKGROUND OF THE INVENTION

This application relates to systems and methods for link state database exchanges and processes when two Open Shortest Path First (OSPF) routers are forming a full adjacency. More particularly, the present invention relates to systems and methods for eliminating unnecessary link state database exchanges and processes.

Link state databases are exchanged when two Open Shortest Path First (OSPF) routers are trying to establish a full adjacency. If the full adjacency is to be formed between the OSPF routers, the link state databases are synchronized through a database exchange procedure. A first router sends a second router a summary of a link state database of the first router through a set of Database Description (DD) packets that contain a header of every Link State Advertisement (LSA) in the link state database of the first router. For every received LSA header that is contained in the DD packets, the second router compares the LSA header with a corresponding LSA instance in a link state database of the second router. The second router sends the first router a request for the LSA if the LSA instance in the database of the second router is older. The second router sends the first router a summary of a link state database of the second router through a set of Database Description (DD) packets that contain a header of every Link State Advertisement (LSA) in the link state database of the second router. For every received LSA header that is contained in the DD packets, the first router compares the LSA header with a corresponding LSA instance in the link state database of the first router. The first router sends the second router a request for the LSA if the LSA instance in the database of the first router is older.

An adjacency becomes full from the point of view of the first router, when the first router finishes sending the summary of the link state database of the first router and processing all the DD packets from the second router and gets all the LSAs from the second router that the first router has requested. An adjacency becomes full from the point of view of the second point of view, when the second router finishes sending the summary of the link state database of the second router and processing all the DD packets from the first router and gets all the LSAs from the first router that the second router has requested. A full adjacency between the first router and the second router is formed successfully when an adjacency becomes full from the point of view of both the first router and the second router.

For a large database, eliminating the unnecessary database exchanges may speed up establishment of full adjacency and save lots of link bandwidths for transmission of the unnecessary DD packets and central processing unit (CPU) cycles for the process of the packets.

Conventional mechanisms and methods use a passive approach for eliminating unnecessary link state database exchanges and processes. For two routers to establish a full adjacency, if a first router receives the same or a more recent instance of a LSA listed in a DD packet from a second router, the first router does not need to list the LSA in the DD packet to be sent to the second router. There are some concerns regarding this passive approach. For example, about 50% of the unnecessary exchanges and processes of the link state database are done in the passive approach. Such unnecessary exchanges of link state databases can consume link bandwidth between routers.

From the foregoing, systems, devices, and methods for eliminating undesired link state database exchanges and processes are desired.

BRIEF SUMMARY OF THE INVENTION

Embodiments of the present invention pertain to methods and systems for eliminating undesired link state database exchanges and processes, which use an active approach. The methods and systems can deduce information about unreachable routers from link state changes received and records the information. The methods and systems can eliminates the undesired link state database exchanges and processes by using the information regarding the unreachable routers recorded and the information about reachable routers calculated from the link state database.

In one embodiment, a network component includes a storage medium, an interface associated with a neighboring network component; and a processor coupled with the storage medium and the interface. The processor is capable of determining if the neighboring network component is reachable and generating a neighbor database summary list for forming a full adjacency between the network component and the neighboring network component accordingly. If the neighboring network component is reachable, the neighbor database summary list is empty. If the neighboring network component is unreachable, a time period between a time when the neighboring network component becomes unreachable and a time when the processor starts to generate the neighbor database summary list is less than a Link State Advertisement (LSA) maximum age, and the neighboring network component is not restarted after it becomes unreachable, the neighbor database summary list includes header of every LSA whose content has been changed in a link state database of the network component since the neighboring network component becomes unreachable. Otherwise, the neighbor data summary list includes the entire link state database.

In another embodiment, a network system includes a first network component, a second network component, and a network coupled between the first and second network components. The first network component is capable of determining if the second network component is reachable and generating a neighbor database summary list for forming a full adjacency between the first network component and the second network component accordingly. If the second network component is reachable, the neighbor database summary list is empty. If the second network component is unreachable, a time period between a time when the second network component becomes unreachable and a time when the first network component starts to generate the neighbor database summary list is less than a Link State Advertisement (LSA) maximum age, and the second network component is not restarted after becoming unreachable, the neighbor database summary list includes a header of every LSA whose content has been changed in a link state database since the second network component becomes unreachable. Otherwise, the neighbor data summary list includes the entire link state database.

In other embodiment, a method for establishing a full adjacency between a first network component and a second network component in a network includes determining if the second network component is reachable and generating a neighbor database summary list for forming the full adjacency between the first network component and the second network component accordingly. If the second network component is reachable, the neighbor database summary list is empty. If the second network component is unreachable, a time period between a time when the second network component becomes unreachable and a time when the first network component starts to generate the neighbor database summary list is less than a Link State Advertisement (LSA) maximum age, and the second network component is not restarted after it becomes unreachable, the neighbor database summary list includes a header of every LSA whose content has been changed in a link state database since the second network component becomes unreachable. Otherwise, the neighbor data summary list includes the entire link state database.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

The present invention relates to methods and systems for eliminating undesired link state database exchanges and processes by deducing and/or using information about unreachable routers and information in a link state database. In some embodiments, the information about unreachable routers can be deduced from received link state changes. The information about the unreachable routers can be recorded for a given period of time, such as 3600 seconds. A neighbor database summary list can be generated such that the list does not include the LSAs that a neighboring router has through using the information about the unreachable routers and reachable routers, and determining whether the neighboring router is restarted after it becomes unreachable.

Figure 1:
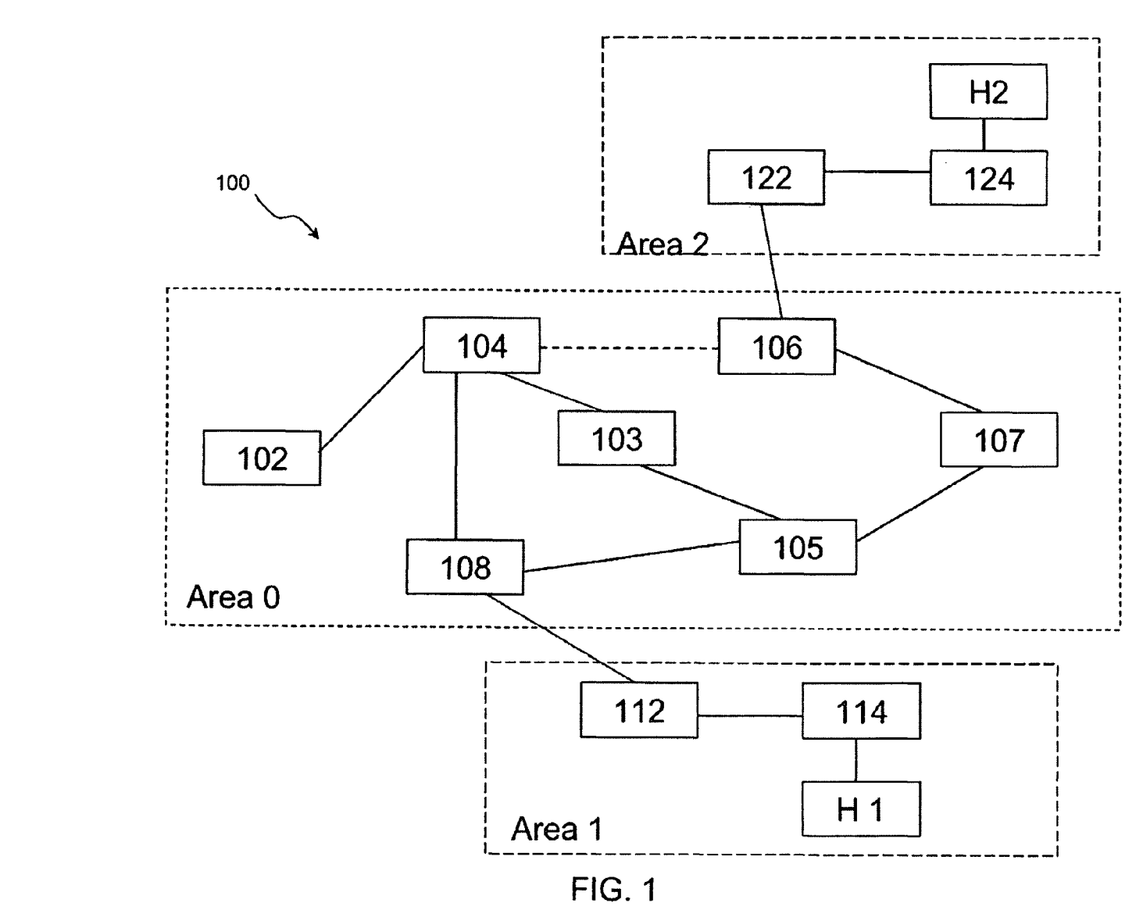
FIG. 1 is an exemplary drawing showing a general autonomous system (AS).

FIG. 1 is an exemplary drawing showing an autonomous system (AS). AS 100 may include network components, such as routers 102, 103, 104, 105, 106, 107, 108, 112, 114, 122, and 124, and hosts $H_1$ and $H_2$ (e.g. computers). A solid line between two routers (e.g., the line between routers 104 and 108) represents a full OSPF adjacency between these two routers that has been established. A dashed line between two routers (e.g., the dashed line between routers 104 and 106) represents a full OSPF adjacency that is to be established. All the network components may be operated under a common administration that shares a common routing strategy through one or more networks. As shown, AS 100 can be divided into several areas, such as Area 0, Area 1 and Area 2, each of the areas may include groups of contiguous networks and attached hosts. A router may participate in multiple areas. For example, router 108 has multiple interfaces to other neighboring routers 112, 104 and 105. Router 108 may participate in Area 0 and Area 1, but not Area 2, because there is no interface between router 108 and router 122 in Area 2.

Figure 2:
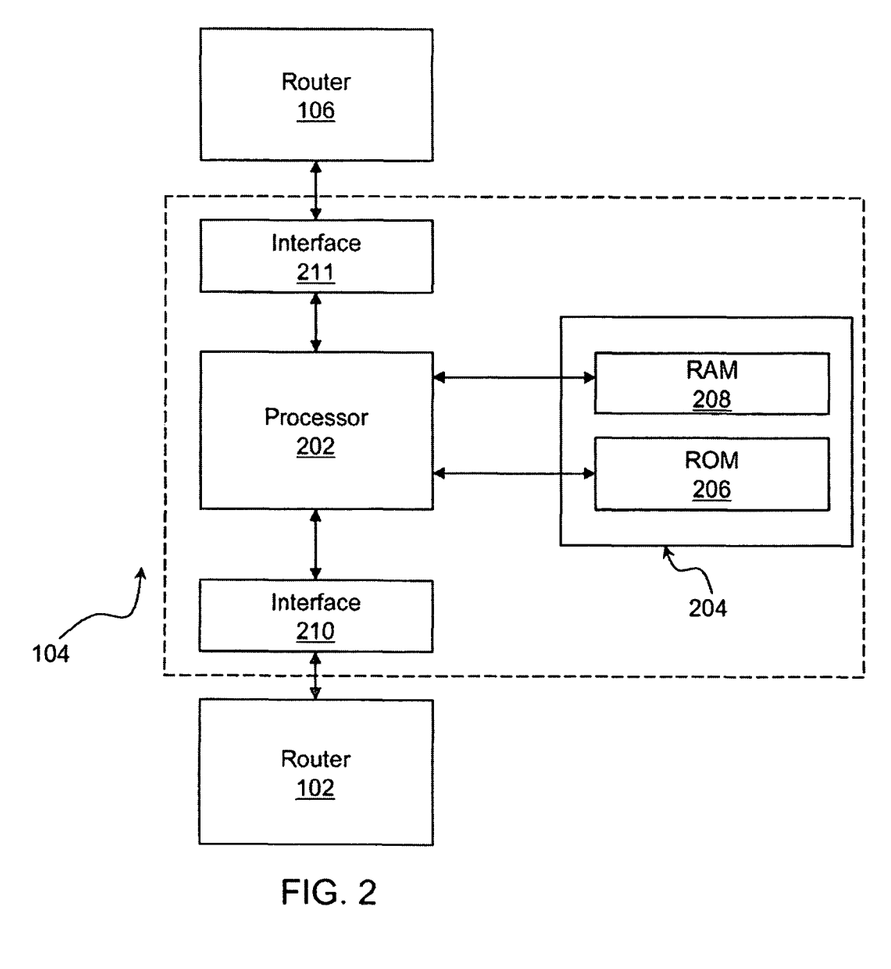
FIG. 2 is a schematic drawing showing an exemplary router coupled to neighboring routers.

FIG. 2 is a schematic drawing showing an exemplary router coupled to neighboring routers. Router 104 may be coupled with at least one of the neighboring routers such as routers 102 and 106 within Area 0. Router 104 may include processor 202 (which may be referred to as a central processor unit or CPU) that is in communication with a storage medium 204, which can include, for example, read only memory (ROM) 206, and/or random access memory (RAM) 208, and interfaces 210, 211. Processor 202 may be implemented as one or more CPU chips. Processor 202 can perform method 300 set forth below described in conjunction with FIG. 3. One of ordinary skill in the art will appreciate that router 104 may contain more than one processors, where some of processors may recognize the receipt of and promote the sending of data via the other processors.

Storage medium 204 may include one or more disk drives or tape drives and can be used for storage of data. Storage medium 204 may be used to store programs that are loaded into RAM 208 when such programs are selected for execution. ROM 206 is used to store instructions and perhaps data that are read during program execution. ROM 206 is a non-volatile memory device that typically has a small memory capacity relative to the larger memory capacity of secondary storage. RAM 208 is used to store volatile data and perhaps to store instructions. Interfaces 210, 211 can be configured to transmit packets to and/or receive packets from routers 102 and 106.

In some situations, a complete exchange and process of link state databases is not required when two OSPF routers form a full adjacency. For example, when two routers in a network are reachable by each other within an area, such as Area 0, a full adjacency may be formed between the routers without exchanging their link state databases, because the routers have the same link state database due to the fact that the routers are connected within Area 0, either directly or indirectly.

In other situations, portions of the database exchanges and processes are not required. For example, when the connection between the routers is down for a short period of time and then up again, most parts of the link state databases of the routers remain unchanged while only small portions of the databases may be different. In this situation, there is no need for the routers to exchange the data that remain the same in the databases.

Another example is in a Mobile Ad-Hoc Network (MANET) where nodes are mobile, when a mobile node moves out of a first transmission range and into a second transmission range in the same OSPF area in a short time, adjacencies of the mobile node to the nodes in the first transmission range are down and adjacencies of the mobile node to nodes in the second transmission range are established. In this situation, most data in the databases remain the same.

A router operates a neighbor database summary list when forming a full adjacency with a neighboring router in a convention method, when a first router receives the same or newer LSA listed in a DD packet from a second router, the first router may decide not to list the LSA in the DD packet to be sent to the second router. However, the first router has already processed the LSA while the second router has also sent the LSA to the first router. In this case, sending and processing of the LSA are not necessary and can be eliminated to speed up establishment of full adjacency between routers and save link bandwidths for transmission of LSAs in a DD packet.

Figure 3:
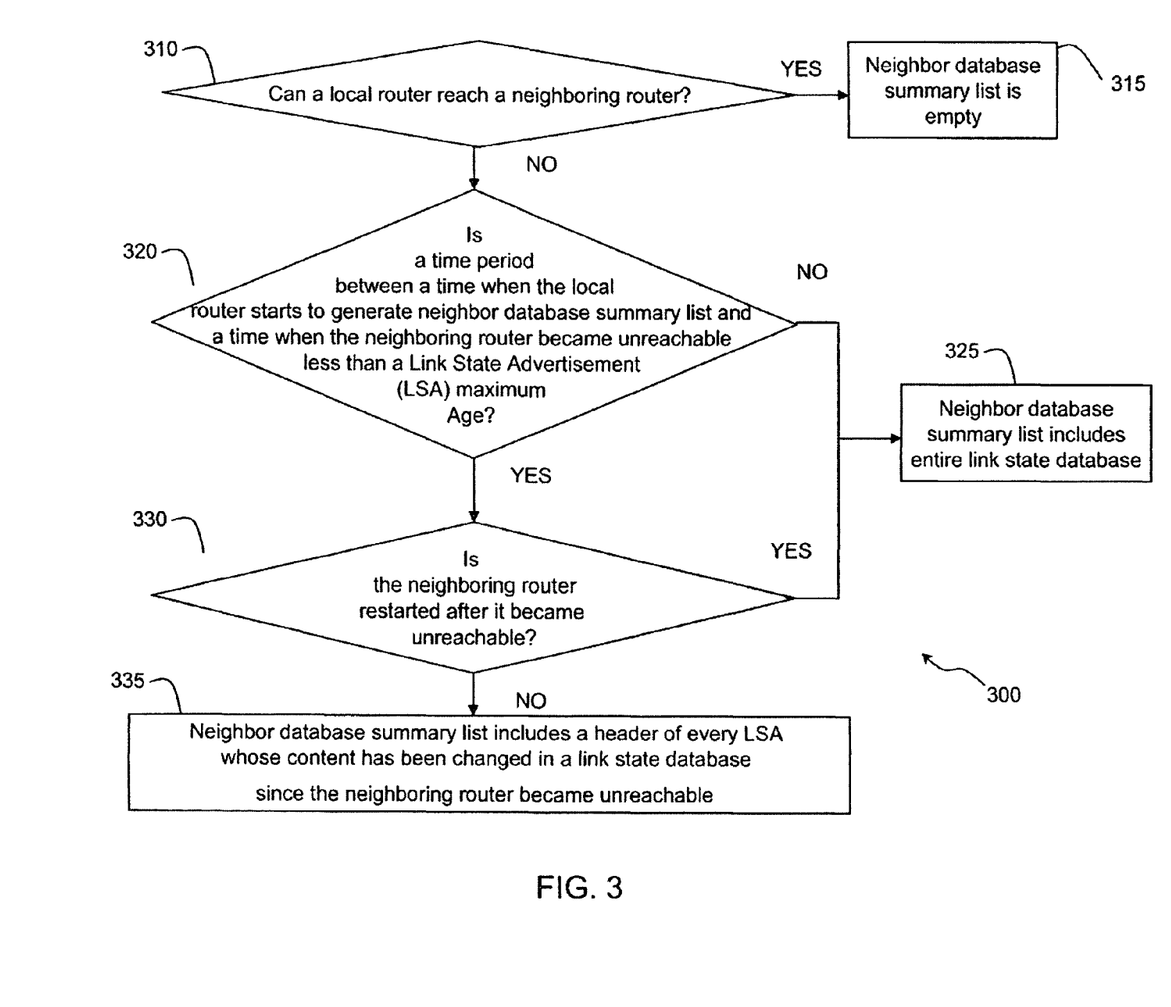
FIG. 3 is a flowchart showing an exemplary method for generating a neighbor database summary list for forming a full adjacency between two routers according to embodiments of the invention.

A feature of the present invention is to eliminate unnecessary link state database exchanges and processes. FIG. 3 is a flowchart showing an exemplary method for generating a neighbor database summary list for forming a full adjacency between two routers. This method eliminates unnecessary link state database exchanges and processes. As shown, method 300 may include steps 310, 320, and 330. At step 310, a local router, such as router 104 (shown in FIG. 2), determines if the local router can reach a neighboring router such as router 102 or 106 within an area such as Area 0. If router 104 determines that router 106 is reachable, router 104 generates an empty neighbor database summary list. Since router 104 can reach router 106, no link state database exchange or process is required and the neighbor database summary list is empty.

If router 104 determines that router 106 is not reachable, step 320 is performed. At step 320, router 104 determines if a time period between a time when router 104 starts to generate a neighbor database summary list and a time when router 106 becomes unreachable is less than a Link State Advertisement (LSA) maximum age. In a particular embodiment, the LSA maximum age may be, for example, 3,600 seconds. If router 104 determines that the time period is not less than the LSA maximum age, router 104 can generate a neighbor database summary list at step 325. The summary list includes the entire link state database for a full adjacency between routers 104 and 106.

If router 104 determines that the time period is less than the LSA maximum age, step 330 is performed. At step 330, router 104 determines if router 106 is not restarted after router 106 becomes unreachable. If router 104 determines that router 106 is restarted after router 106 becomes unreachable, router 104 generates a neighbor database summary list at step 325. The list includes the entire link state database for a full adjacency between routers 104 and 106.

If router 104 determines that router 106 is not restarted after router 106 becomes unreachable, router 104 generates a neighbor database summary list at step 335. The list includes a header of every LSA, where content of the LSA is changed in the link state database after router 106 becomes unreachable. By using method 300 to generate different neighbor database summary lists according to various link statuses between routers 104 and 106, some undesired link state database exchange and/or process between routers 104 and 106 can be avoided. A full adjacency between routers 104 and 106 can be desirably and efficiently established.

According to embodiments of the invention, the steps 310, 320, and 330 may be combined or separately performed. Furthermore, the sequence of the steps 310, 320, and 330 may be modified and/or changed. The scope of the invention is not limited to method 300 shown in FIG. 3.

Following are descriptions in regard to determining a time when a neighboring router is restarted. To determine whether a neighboring router, e.g., router 106, is restarted after becoming unreachable, a local router, such as router 104, uses the information about a latest time when router 106 is restarted. The neighboring router may send the local router the information through extensions to some protocol packets and modifications to the procedures for processing the packets. In one set of embodiments, the information may include a router up time period and/or a latest router restart time. The extensions are backward compatible.

Router 104 may communicate with router 106 about the restart time (RT) and/or the up time period in several ways. In order to store the information about the restart time of router 106, router 104 may add at least one field to the neighbor database structure. In a specific embodiment, one field is a restart time field for storing the neighboring router restart time, and the other field is a know-restart flag field indicating whether a local router, i.e., router 104, knows that a neighboring router, i.e., router 106, is capable of handling the restart time.

Figure 4:
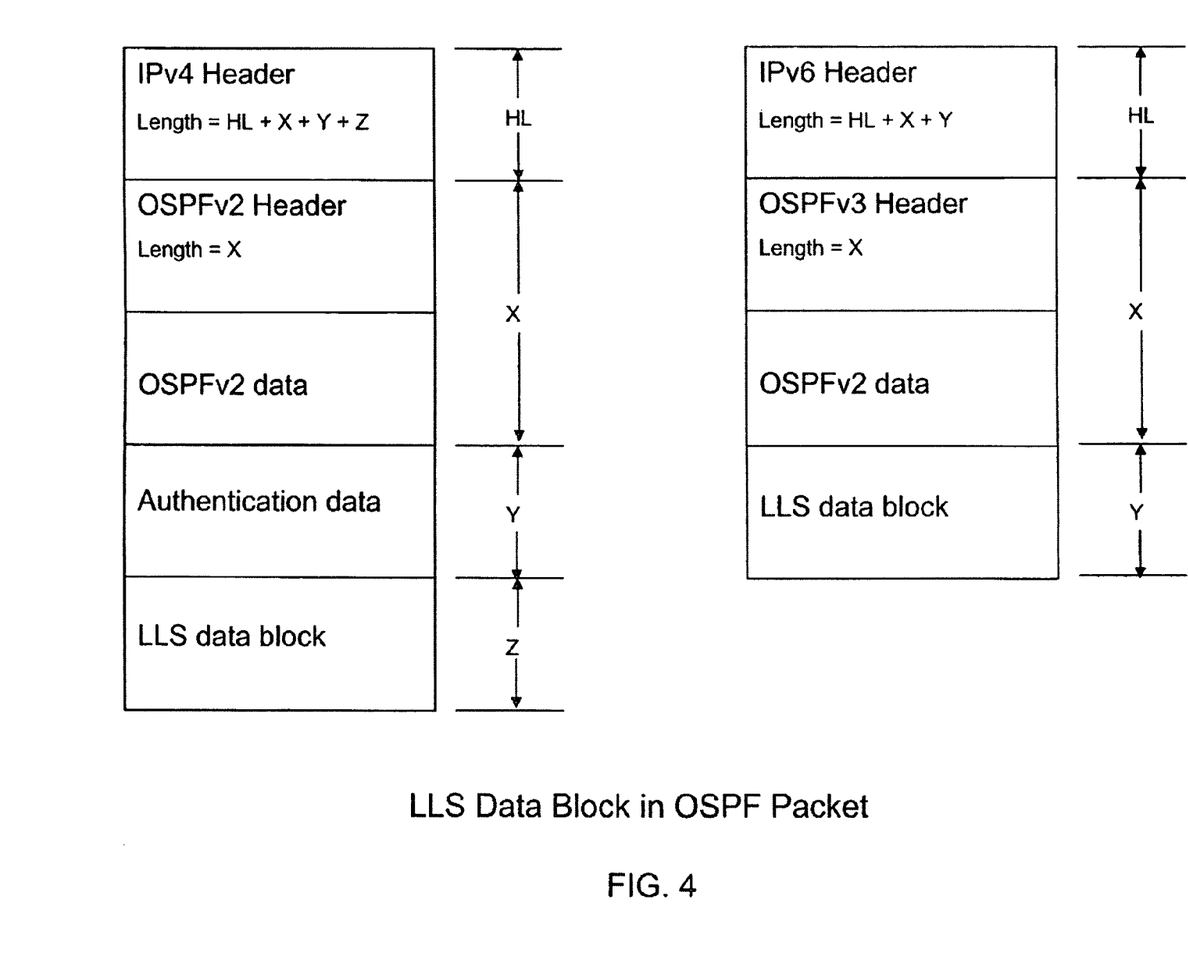
FIG. 4 shows an exemplary format of LLS data block in OSPF packets.

FIG. 4 shows an exemplary format of LLS data block attached to an OSPF packet in Internet Protocol version 4 (IPv4) and Internet Protocol version 6 (IPv6). The LLS data block is appended to the end of the OSPF packet or after the authentication data block when cryptographic authentication is used. The length of the LLS data block is not included in the length of the OSPF packet, but included in IPv4/IPv6 packet length.

In one embodiment, router 106 can attach a router up time period TLV including a router up time period in a Local Link Signaling (LLS) block to a first OSPF Database Description (DD) packet to be sent to router 104.

Figure 5:
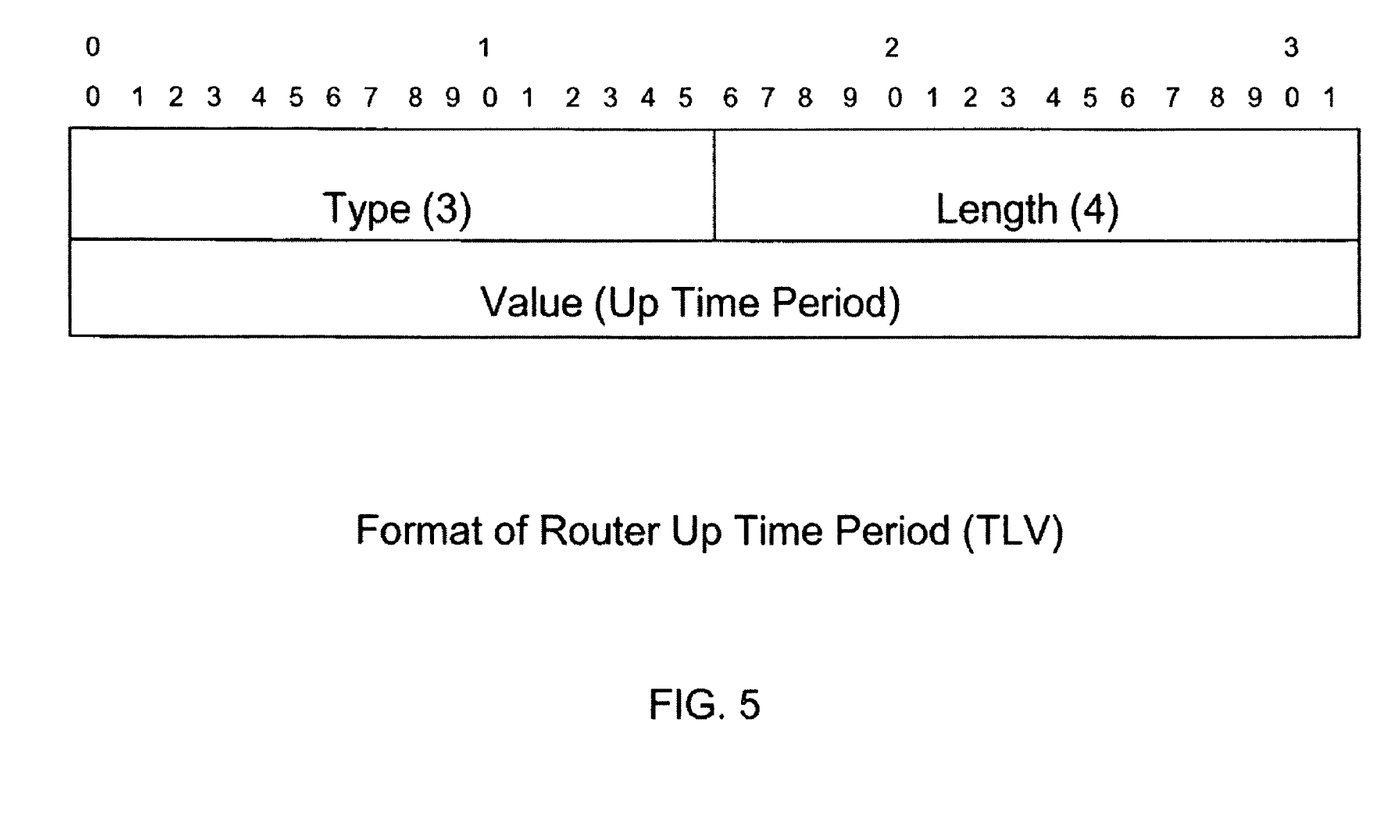
FIG. 5 shows an exemplary format of a router up time period TLV according to embodiments of the invention.

FIG. 5 shows an exemplary format of a router up time period TLV. As shown, the value of the Type field in the router up time period TLV may be 3 or may be assigned by Internet Assigned Numbers Authority (IANA). The length of the Value field in the TLV may be 4. The Value field may be the router up time period in seconds. It is noted that the format of the router up time period TLV shown in FIG. 5 is merely an example. The scope of the invention is not limited thereto.

When router 104 receives the first DD packet from router 106, router 104 checks whether the router up time period TLV in the LLS block is attached to the OSPF DD packet. If so, router 104 can convert the router up time period in the TLV into the router restart time. Router 104 can also store the router restart time into a restart-time field in the corresponding neighbor data structure for router 106. Router 104 can also set a know-restart flag in the neighbor data structure, indicating that router 106 is capable of handling the restart time and that router 104 knows when router 106 is restarted. Initially, the restart-time (RT) field in the neighbor data structure is zero. The know-restart flag can be inferred from the value of the restart-time field in the neighbor data structure.

Figure 6:
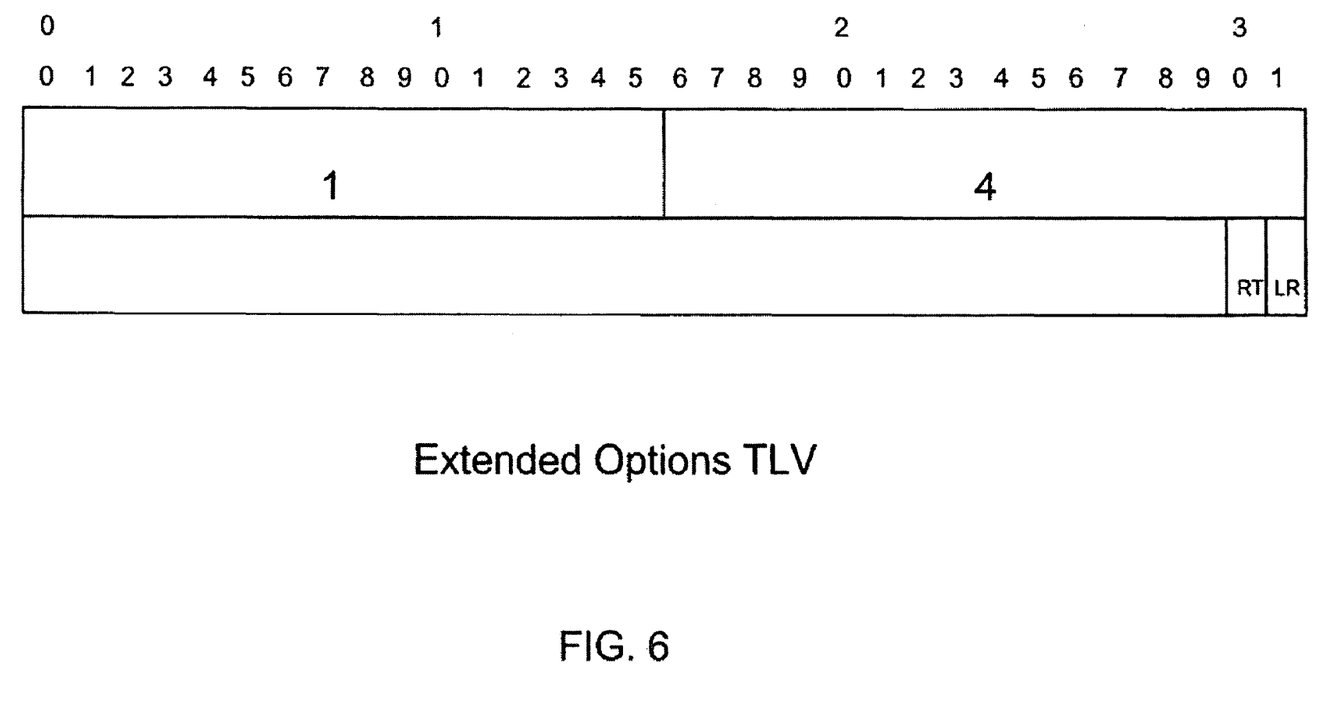
FIG. 6 shows extended options TLV according to embodiments of the invention.

In another embodiment, router 106 can send the router up time period to router 104 by exchanging an option flag RT between routers 104 and 106 and their router up time periods. The option flag RT may indicate that a router is capable of handling restart time. When router 106 that is capable of handling restart time, sends a Hello packet to router 104, router 106 can set the option flag RT. When router 106 sends a DD packet to router 104, router 106 can also set the option flag RT. When router 104 receives the Hello packet with the option flag RT, router 104 can set the know-restart field in the corresponding neighbor data structure for router 106, indicating that router 106 knows how to handle the restart time. When router 104 receives the DD packet with the option flag RT, router 104 can check whether the know-restart field in the corresponding neighbor data structure has already been set. If the know-restart field has not been set, an option flag mismatch handling can be started. The option flag RT can have a value of 0x00000002 and can be added into the LLS Extended Options TLV as shown in FIG. 6. The extended options TLV in the LLS block can be attached to Hello packets and DD packets.

In a particular embodiment, router 106 is capable of handling restart time. Before Router 106 sends a first DD packet to router 104, router 106 checks whether router 104 is capable of handling restart time by checking the know-restart field in the corresponding neighbor data structure for router 104. If the know-restart field is set, i.e., router 104 is able to handle the restart time, router 106 can attach the router up time period TLV in the LLS block to the DD packet to be sent to router 104. If the know-restart field is not set, router 106 does not attach the TLV to the DD packet.

When router 104 receives the DD packet from router 106, router 104 can process the DD packet regarding the router up time period. If there is a router up time period TLV in the LLS block attached to the DD packet and the know-restart field in the corresponding neighbor data structure for router 106 is also set, router 104 can convert the router up time period in the TLV into the router restart time and store the router restart time into the restart-time field in the corresponding neighbor data structure.

If there is a router up time period TLV in the LLS block attached to the DD packet and the know-restart field in the corresponding neighbor data structure for router 106 is not set, a mismatch handling process may be performed. Alternatively, if there is no router up time period TLV in the LLS block attached to the DD packet and the know-restart field in the corresponding neighbor data structure for router 106 is set, a mismatch handling process may also be performed.

In a specific embodiment, router 106 can send a router up time period to router 104 by attaching the router up time period TLV in the LLS block to the OSPF Hello packet to be sent to router 104. When router 104 receives the OSPF Hello packet from router 106, router 104 can process the packet regarding the router up time period in a following method. If there is a router up time period TLV in the LLS block attached to the Hello packet and the know-restart field in the corresponding neighbor data structure for router 106 is not set, router 104 can convert the router up time period in the TLV into the router restart time, store the router restart time into the restart-time field in the corresponding neighbor data structure, and set the know-restart flag in the neighbor data structure, indicating that router 106 is capable of handling the restart time and router 104 knows when router 106 is restarted. Initially, the restart-time field and the know-restart field in the neighbor data structure are zeros. The know-restart flag can be inferred from the value of the restart-time field in the neighbor data structure.

Alternatively, if there is a router up time period TLV in the LLS block attached to the Hello packet and the know-restart field in the corresponding neighbor data structure for router 106 is also set, router 104 can convert the router up time period in the TLV into the router restart time, and store the router restart time into the restart-time field in the neighbor data structure.

The methods for determining when the neighboring router is restarted are merely exemplary. Other methods for determining the restart time of the neighboring router can be used. The scope of the invention is not limited thereto.

Following are descriptions regarding methods for deducing and recording the information about an unreachable router. In some embodiments, information about an unreachable router can include, for example, a time $t_u$ at which the router becomes unreachable and a time $t_c$ for every LSA at which the LSA is changed after time $t_u$. When a full adjacency is formed between routers 104 and 106, each of the routers 104 and 106 can use the information about the other router to desirably establish the adjacency by eliminating undesired link state database exchanges and processes. For example, router 106 becomes unreachable at time $t_u$ and the time period between the current time and time $t_u$ is less than a LSA maximum age MaxAge (e.g., 3600 seconds), router 104 can send router 106 the headers of LSAs that are changed after time $t_u$.

A remote router, e.g., router 106, may become unreachable from a local router, i.e., router 104, resulting from network failures (e.g., the link/interface between router 105 and 107 is down). The time $t_u$ at which the remote router becomes unreachable can be the time at which the network failures occur. Following are exemplary methods of the application showing how to determine the unreachable time of the remote router, i.e., the time at which the failures happen.

In one embodiment, if router 106 becomes unreachable from reachable after the shortest path first algorithm is run in router 104 against the link state database, a tuple $<r, t_u>$ is recorded, wherein r is router 106, $t_u$ is the time at which a failure such as a link down happens so that router 106 becomes unreachable.

The failure may be classified into two classes: link/interface failures and node failures. The link/interface failures may be classified into two classes: point-to-point link/interface failures and broadcast link/interface failures. Point-to-point link/interface failures may include point to multipoint link/interface failures. Broadcast link/interface failures may include non-Broadcast Multi-Access (NBMA) link/interface failures. For any type of links/interfaces, if the failures can not be considered as one of the three classes, it can be classified into a new class.

When a point-to-point link/interface connecting router A (e.g. router 105) and router B (e.g. router 107) in the network fails, a LSA with the link down is regenerated and flooded by each of the routers A and B. For the LSA, $t_r$ represents the earliest time at which one LSA is received by a local router 104 and $t_p$ represents the time delay for the LSA to reach the local router 104 from router A or B (e.g. router 105 or 107). The time delay $t_p$ for the LSA is less than the age of the LSA, which can be used as an estimated value of $t_p$. The estimated $t_p$ can be (255 seconds–time to live (TTL) of the LSA update packet). The smaller one of the two estimated values can be selected for the time $t_p$. In a particular embodiment, the exact delay can be less than an estimated value. The time $t_u$ at which the link/interface fails can be estimated as Formula (1) shown below:

$$t_u = (t_r - t_i - t_p) \qquad (1)$$

where $t_i$ represents a maximum time delay for an OSPF router to detect a link/interface failure, such as a point-to-point link/interface failure, or a broadcast link/interface failure. The estimated value $t_u$ may be earlier than the exact time at which the failure happens. Accordingly, all the LSAs that are changed after the exact time can be included in a neighbor database summary list if a full adjacency is established with a neighboring router 106.

For a broadcast link failure in the network, if k routers are attached to the link, k router LSAs and one network LSA with the information about link down are regenerated and flooded. The network LSA is generated by a designated router for the link, while the router LSAs are generated by the k routers attached to the link. The time $t_u$ at which the link fails can be estimated by using Formula (1).

For n (n>1) link failures, the time at which each of the n link failures happens can be calculated by Formula (1). Time $t_u$ is the earliest time among all the n times that are calculated for n link failures.

For one node failure in the network (e.g. router 105 is down), every node (e.g. routers 103, 107 and 108) that has a full adjacency with the failed node (e.g. router 105) can regenerate and flood the LSA with the link to the failed node down. When there are multiple LSAs, $t_r$ is the time at which the earliest LSA among the LSAs is received by a local router (e.g. router 104), and $t_p$ is the time delay for the earliest LSA to reach the local router 104 from a node (e.g. router 103) generating LSA, the time $t_u$ at which the node fails can be estimated by Formula (2) below:

$$t_u = (t_r - t_n - t_p) \qquad (2)$$

where $t_n$ represents the maximum time delay for a router to detect a node failure.

The estimated value for $t_u$ is earlier than the exact time at which the failure happened. Accordingly, all the LSAs that are changed after the exact time can be desirably included in the neighbor database summary list if a full adjacency is to be established with router 106.

For k (k>1) node failures in a network, at most k groups of LSAs are regenerated and flooded in the network. Every LSA in one of the k groups can include the information about the link to the same failed node down. For each group of LSAs, the time at which the node fails can be estimated as the one node failure shown in Formula (2) above. The time $t_u$ at which router 106 becomes unreachable because of k node failures is estimated as the earliest time among all the estimated node failure times.

According to embodiments of the invention, for link and node failures in the network, one estimated time is the time at which the earliest link failure happens. The other estimated time is the time at which the earliest node failure happens. The time $t_u$ at which router 106 becomes unreachable due to the link and node failures is the earlier one of the two estimated times.

Following are descriptions regarding another exemplary method for determining a failure time by using all the updated LSAs received. In one embodiment, a failure time is derived from every LSA in the way similar to the method described above. The earliest time is selected as $t_u$. For every updated LSA received at time $t_r$, the failure time derived from the LSA is shown in Formula (3) below:

$$\text{Failure time} = (t_r - \max(t_i, t_n) - t_p) \qquad (3)$$

where $t_i$ represents a maximum time delay for a router to detect an interface failure, and $t_n$ represents a maximum time delay for a router to detect a node failure.

Following are descriptions regarding finding and recording LSA change time $t_c$. In one embodiment, if one or more routers becomes unreachable in a time period less than the LSA maximum age (MaxAge), time $t_r$ can be used as time $t_c$, where time $t_r$ is the time when a LSA is received, and time $t_c$ is the time when the LSA is changed for recording the time $t_c$ for the LSA. The time $t_c$ may be a little later than the actual time when the LSA is changed.

Following are descriptions regarding methods for recording the LSA change time $t_c$. In a further embodiment, a field similar to the field for LSA age can be added into the data structure for storing a LSA in a link state database. An estimated change time $t_c$ can be stored into this added field for each changed LSA.

In another embodiment, for recording the LSA change time $t_c$, a link field is added into a data structure for storing a LSA, an array, and a variable for index of the array into the data structure for storing an area. The link field can be used to link all the LSAs that have the same change time. The size of the array can be the number of time units in the LSA maximum age (e.g., 3600 seconds). For example, a time unit can be one second, 1/10 second or other smaller time unit. The time unit can depend on implementation. The array and the variable for the index of the array can be considered as a relative clock. The variable of the index starts from 0, and increases by one time unit. The variable of the index restarts from 0 when reaching the size of the array. If the variable is k at a current time, time $t_j$ represented by an element of the array at index j is shown in Formula (4) below:

$$t_j = (\text{current time} - \text{time unit} * d) \qquad (4)$$

where $d=(k-j)$ if $k \geq j$ and $d=(\text{array size}-j+k)$ if $k<j$.

The element of the array at index j can be a pointer that points to a header of a linked list of all the LSAs that are changed at time $t_c$, where $t_c = t_j$ or $(t_c + \text{one time unit}) > t_j$ if $t_c < t_j$ (i.e., rounding up $t_c$ is $t_j$).

Following are descriptions regarding reusing LSA age to add LSAs into a neighbor database summary list. When a local router, e.g., router 104, is going to establish a full adjacency with a remote router, e.g., router 106, that becomes unreachable at time $t_u$, router 104 can use time $t_u$ and the age of every LSA to put all the LSAs that are changed after time $t_u$ into the neighbor database summary list. For router 106 that becomes unreachable at time $t_u$, time $t_u$ can be estimated in one of the ways described above using Formulas (1)-(3).

For every changed LSA received at time $t_r$ after time $t_u$, LSA age is less than 255 seconds when received. 255 seconds is the maximum time to live value in an Internet Protocol (IP) packet containing the LSA. Time $t_u$ and the LSA age are used to decide whether the LSA is added into the neighbor database summary list. When a full adjacency to router 106 is established, every LSA, that satisfies the condition that is "current age of LSA<current time−$t_u$+255", can be added into the neighbor database summary list. As shown, (current time−current age of LSA) is equal to ($t_r$−LSA age when received at time $t_r$). Accordingly, all the LSAs that are changed after router 106 becomes unreachable are included in the database summary list.

What is claimed is:

1. A network component, comprising:
   a non-transitory storage medium;
   an interface associated with a neighboring network component; and
   a first processor coupled with the non-transitory storage medium and the interface, wherein the first processor has instructions to determine whether the neighboring network component is reachable and instructions to generate a neighbor database summary list for forming a full adjacency between the network component and the neighboring network component, wherein the instructions to the first processor are configured to: compute a time period between a time when the network component starts to generate a neighbor database summary list and a time when the neighboring network component becomes unreachable; and generate the neighbor database summary list, wherein:
   the neighbor database summary list is empty if the neighboring network component is reachable;
   the neighbor database summary list comprises a header of every Link State Advertisement (LSA) whose content changed in a link state database of the network component after the neighboring network component becomes unreachable if the neighboring network component is unreachable, a time period between a time when the network component starts to generate the neighbor database summary list and a time when the neighboring network component becomes unreachable is less than a LSA maximum age, and the neighboring network component is not restarted after becoming unreachable;

the neighbor data summary list comprises an entire link state database if the neighboring network component is restarted after becoming unreachable and a time period between a time when the network component starts to generate the neighbor database summary list and a time when the neighboring network component becomes unreachable is not less than a LSA maximum age.

2. The network component of claim 1, wherein the first processor has further instructions to receive and process a router up time period or a latest router restart time from the neighboring network component and instructions to determine whether the neighboring network component is restarted.

3. The network component of claim 2, wherein the router up time period or the latest router restart time is attached into an Open Shortest Path First Database Description (OSPF DD) packet that is a first OSPF DD from the neighboring network component.

4. The network component of claim 3, wherein the first processor has instructions to send a router up time period or a latest router restart time of the network component to the neighboring network component.

5. The network component of claim 1, wherein the first processor has further instructions to exchange an option flag restart time (RT) and the at least one of the router up time period or the latest router restart time with the neighboring network component.

6. The network component of claim 5, wherein an Extended Options TLV with the option flag RT set is attached into an Open Shortest Path First (OSPF) Hello packet and an Open Shortest Path First (OSPF) DD packet.

7. The network component of claim 5, wherein the first processor has instructions to receive and process the Extended Options TLV with the option flag RT in an Open Shortest Path First (OSPF) Hello packet from the neighboring network component.

8. The network component of claim 5, wherein the first processor has instructions to receive and process the Extended Options TLV with the option flag RT in an Open Shortest Path First (OSPF) DD packet from the neighboring network component.

9. The network component of claim 5, wherein the first processor has instructions to send the Extended Options TLV with the option flag RT in an Open Shortest Path First (OSPF) Hello packet and an Open Shortest Path First (OSPF) DD packet to the neighboring network component.

10. The network component of claim 5, wherein the first processor has instructions to attach a router up time period of the network component or a latest router restart time of the network component into a first OSPF DD packet and to send the OSPF DD packet to the neighboring network component if the processor receives the option flag RT in an OSPF Hello packet from the neighboring network component.

11. The network component of claim 5, wherein the first processor has instructions to receive a router up time period or a router restart time in an OSPF DD packet from the neighboring network component, wherein the processor has instructions to process the router up time or the router restart time if the processor receives the option flag RT in an OSPF Hello packet packet from the neighboring network component.

12. The network component of claim 1, wherein the first processor has instructions to determine when the neighboring network component becomes unreachable.

13. The network component of claim 12, wherein the time when the neighboring network component becomes unreachable is equal to $t_r-t_i-t_p$, wherein $t_r$ is an earliest time at which one of LSAs being triggered by an interface failure and being received by the network component, $t_i$ is a maximum time delay for a second processor to detect the interface failure, and $t_p$ is a time delay of the earliest LSA from an origin of the earliest LSA to the network component.

14. The network component of claim 13, wherein the interface failure comprises at least one of a point-to-point interface failure or a broadcast interface failure.

15. The network component of claim 12, wherein the time when the neighboring network component becomes unreachable is equal to $(t_r-t_n-t_p)$, wherein $t_r$ is an earliest time at which one of LSAs being triggered by a network component failure and being received by the network component, $t_n$ is a maximum time delay for a second processor to detect the network component failure, and $t_p$ is a time delay of the earliest LSA from an origin of the earliest LSA to the network component.

16. The network component of claim 12, wherein the time when the neighboring network component becomes unreachable is equal to $(t_r\text{-max}(t_i,t_n)-t_p)$, wherein $t_r$ is an earliest time at which one of LSAs being triggered by a network component failure and/or an interface failure and being received by the network component, $t_i$ is a maximum time delay for a second processor to detect the interface failure, $t_n$ is a maximum time delay for a third processor to detect the network component failure, and $t_p$ is a time delay of the earliest LSA from an origin of the earliest LSA to the network component.

17. The network component of claim 1, wherein the first processor has
instructions to determine whether a LSA content is changed after the neighboring network component becomes unreachable,
instructions to record a time $t_r$ when the LSA is received and the content of the LSA is changed; and
instructions to compare the time $t_r$ and a time $t_u$ when the neighboring network component becomes unreachable and to guarantee that the LSA content is changed after the neighboring network component becomes unreachable if $t_r$ is after $t_u$.

18. The network component of claim 1, wherein the processor has instructions to determine whether a LSA content is changed after the neighboring network component becomes unreachable;
instructions to use an age $t_a$ of the LSA, a time $t_s$ when a neighbor database summary list is generated, and a time $t_u$ when the neighboring network component becomes unreachable; and
instructions to guarantee that the LSA content is changed after the neighboring network component becomes unreachable if $t_a<t_s-t_u+255$.

19. A method for establishing a full adjacency between a first network component and a second network component, comprising:
determining whether the second network component is reachable;
computing a time period between a time when the first network component starts to generate a neighbor database summary list and a time when the neighboring network component becomes unreachable; and generating a neighbor database summary list for forming the full adjacency between the first network component and the second network component, wherein:
the neighbor database summary list is empty if the second network component is reachable;
the neighbor database summary list comprises a header of every Link State Advertisement (LSA) whose content changed in a link state database of the network component after the second network component becomes unreachable if the second network component is unreachable, a time period between a time when the first network component starts to generate the neighbor database summary list and a time when the second network component becomes unreachable is less than a LSA maximum age, and the second network component is not restarted after becoming unreachable;
the neighbor data summary list comprises an entire link state database if the second network component is restarted after becoming unreachable and a time period between a time when the first network component starts to generate the neighbor database summary list and a time when the second network component becomes unreachable is not less than a LSA maximum age.

20. The method of claim 19, further comprising:
receiving and processing at least one of a router up time period or a latest router restart time attached in an OSPF DD packet from the second network component; and
determining whether the second network component is restarted after becoming unreachable.

21. The method of claim 20, wherein the at least one of the router up time period or the latest router restart time is attached in an Open Shortest Path First Database Description (OSPF DD) packet to be sent to the second network component.

22. The method of claim 20, further comprising exchanging an option flag and the at least one of the router up time period or the latest router restart time between the first and second network components.

23. The method of claim 20, wherein the at least one of the router up time period or the latest router restart time is attached in an Open Shortest Path First (OSPF) Hello packet.

24. The method of claim 19, further comprising determining a time when the second network component becomes unreachable.

25. The method of claim 24, wherein the time when the second network component becomes unreachable is equal to $t_r - t_i - t_p$, wherein $t_r$ is an earliest time at which one of LSAs being triggered by an interface failure and being received by the first network component, $t_i$ is a maximum time delay for a processor to detect the interface failure, and $t_p$ is a time delay of the earliest LSA from an origin of the earliest LSA to the first network component.

26. The method of claim 25, wherein the interface failure includes at least one of a point-to-point interface failure or a broadcast interface failure.

27. The method of claim 24, wherein the time when the second network component becomes unreachable is equal to $(t_r - \max(t_i, t_n) - t_p)$, wherein $t_r$ is an earliest time when one of LSAs being triggered by a network component failure and/or an interface failure and being received by the first network component, $t_i$ is a maximum time delay for detecting an interface failure, $t_n$ is the maximum time delay for detecting a node failure, and $t_p$ is a time delay of the earliest LSA from an origin of the earliest LSA to the first network component.

28. A method for establishing a full adjacency between a first network component and a second network component, comprising:
determining whether the second network component is reachable or unreachable;
if the second network component is unreachable, determining whether the second network component is restarted after becoming unreachable;
computing a time period between a time when the first network component starts to generate a neighbor database summary list and a time when the second network component becomes unreachable;
determining whether the time period is less than a LSA maximum age;
generating the neighbor database summary list for forming the full adjacency between the first network component and the second network component, wherein:
if the second network component is reachable, the neighbor database summary list is empty;
if the second network component is unreachable, and if the second network component is not restarted after becoming unreachable, and if the time period is less than LSA maximum age, the neighbor database summary list comprises a header of every Link State Advertisement (LSA), whose content changed in a link state database of the network component after the second network component becomes unreachable;
if the second network component is unreachable, and if the second network component is restarted after becoming unreachable, and if the time period is not less than LSA maximum age, the neighbor data summary list comprises an entire link state database.

29. The method of claim 28, further comprising:
receiving and processing at least one of a router up time period or a latest router restart time attached in an OSPF DD packet from the second network component.

30. The method of claim 29, wherein the at least one of the router up time period or the latest router restart time is attached in an Open Shortest Path First Database Description (OSPF DD) packet to be sent to the second network component.

31. The method of claim 29, further comprising exchanging an option flag and the at least one of the router up time period or the latest router restart time between the first and second network components.

32. The method of claim 29, wherein the at least one of the router up time period or the latest router restart time is attached in an Open Shortest Path First (OSPF) Hello packet.

33. A network component comprising:
an interface associated with a neighboring network component;
a non-transitory storage medium;
a first processor coupled with the non-transitory storage medium and the interface, wherein the non-transitory storage medium comprises instructions to the first processor to establish a full adjacency between the network component and the neighboring network component, wherein the instructions to the first processor are configured to:
determine whether the neighboring network component is reachable;
determine whether the neighboring network component is restarted after becoming unreachable if the neighboring network component is unreachable;
compute a time period between a time when the network component starts to generate a neighbor database summary list and a time when the neighboring network component becomes unreachable;
determine whether the time period is less than a LSA maximum age;

generate the neighbor database summary list, wherein:
- if the neighboring network component is reachable, the neighbor database summary list is empty;
- if the neighboring network component is unreachable, and if the neighboring network component is not restarted after becoming unreachable, and if the time period is less than LSA maximum age, the neighbor database summary list comprises a header of every Link State Advertisement (LSA), whose content changed in a link state database of the network component after the neighboring network component becomes unreachable;
- if the neighboring network component is unreachable, and if the neighboring network component is restarted after becoming unreachable, and if the time period is not less than LSA maximum age, the neighbor data summary list comprises an entire link state database.

* * * * *